US008239743B2

(12) United States Patent
Wager (10) Patent No.: US 8,239,743 B2
(45) Date of Patent: Aug. 7, 2012

(54) MANAGING COMMON UPLINK RESOURCES IN A CELLULAR RADIO COMMUNICATIONS SYSTEM (75) Inventor: Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 897 days.

(21) Appl. No.: 12/340,304

(22) Filed: Dec. 19, 2008

(65) Prior Publication Data
US 2009/0177941 A1 Jul. 9, 2009

Related U.S. Application Data (60) Provisional application No. 61/015,308, filed on Dec. 20, 2007.

(51) Int. Cl.
G06F 11/00 (2006.01)
(52) U.S. Cl. .......... 714/799; 714/807; 370/329; 370/335
(58) Field of Classification Search .................. 714/752, 714/758, 781, 799, 807; 370/329, 335
See application file for complete search history.

(56) References Cited

U.S. PATENT DOCUMENTS

| 2002/0071407 | A1* | 6/2002 | Koo et al. ............... 370/335 |
| 2002/0170013 | A1* | 11/2002 | Bolourchi et al. ......... 714/758 |
| 2003/0189918 | A1* | 10/2003 | Das et al. ............... 370/349 |
| 2005/0053035 | A1* | 3/2005 | Kwak et al. ............. 370/331 |
| 2005/0193315 | A1* | 9/2005 | Bertinelli et al. ......... 714/758 |
| 2005/0249164 | A1* | 11/2005 | Kwak et al. ............. 370/335 |
| 2006/0041820 | A1* | 2/2006 | Hang et al. ............. 714/758 |

OTHER PUBLICATIONS

ATM Adaptation Layer 5, http://en.wikipedia.org/wiki/ATM_Adaptation_Layer_5., Dec. 19, 2008.

* cited by examiner

Primary Examiner — Scott Baderman
Assistant Examiner — Joseph Kudirka
(74) Attorney, Agent, or Firm — Nixon & Vanderhye P.C.

(57) ABSTRACT

The technology in this application provides for efficient use of a common uplink radio resource, like the common E-DCH resource. A UE lacking a valid radio network identifier, e.g., a UE in an idle mode, receives a data unit and adds error detection bits to generate a new data unit. The new data unit is divided into segments at a lower protocol layer which are provided for transmission to the network via the common uplink radio resource. A network node detects lower protocol layer data unit segments received on the common uplink radio resource and assembles them into an assembled data unit at a higher protocol layer. Error detection bits included with the assembled data unit are used to determine if the assembled data unit includes correctly received data unit segments, e.g., data unit segments from the same UE.

30 Claims, 9 Drawing Sheets

MANAGING COMMON UPLINK RESOURCES IN A CELLULAR RADIO COMMUNICATIONS SYSTEM

PRIORITY APPLICATION

This application claims the priority benefit of U.S. provisional application 61/015,308, entitled "Method and Arrangement in a Telecommunications System," filed on Dec. 20, 2007, the contents of which are incorporated here by reference.

TECHNICAL FIELD

The technology pertains to cellular radio communications, and particularly, to managing common uplink radio resources for mobile terminals to transmit information to a radio access network (RAN).

BACKGROUND AND SUMMARY

The 3rd Generation Partnership Project (3GPP) is a collaboration between groups of telecommunications associations to develop mobile communications systems. Universal Mobile Telecommunications System (UMTS) is one of the third-generation (3G) cell phone technologies, which is also being developed into a 4G technology. The most common form of UMTS uses Wideband-CDMA as the underlying air interface. Evolved UMTS Terrestrial Radio Access (E-UTRA) is the air interface of 3GPP's Long Term Evolution (LTE) upgrade path for mobile networks. E-UTRA is the successor to High Speed Downlink Packet Access (HSDPA) and High Speed Uplink Packet Access (HSUPA) technologies specified in 3GPP releases 5, 6 and 7. Unlike HSPA, LTE's E-UTRA is a new air interface system unrelated to W-CDMA. E-UTRA uses Orthogonal Frequency Division Multiplexing (OFDM) and multiple-input multiple-output (MIMO) antenna technology to support more users, higher data rates and lower processing power required on each handset.

Figure 1:
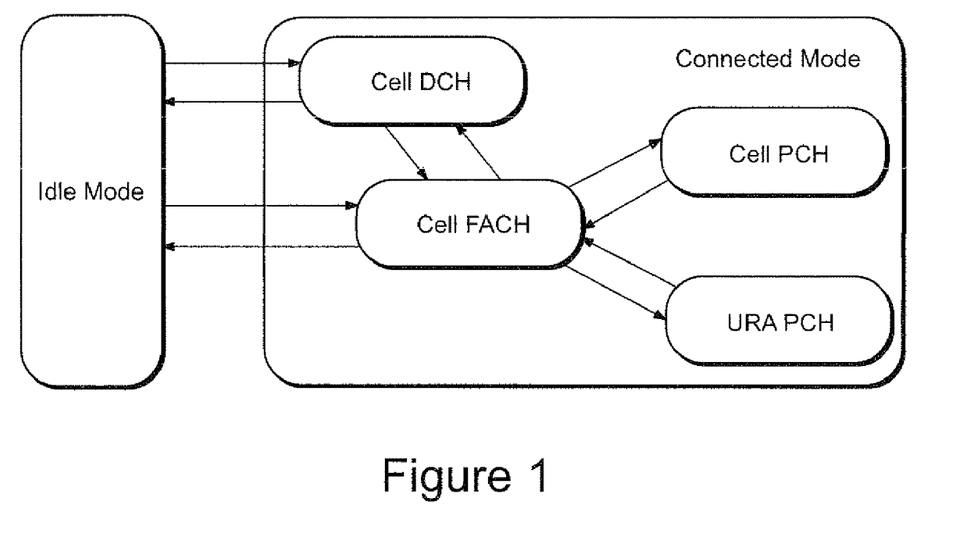
FIG. 1 is an example mode and RRC service state diagram.

In 3GPP Release-8, work is ongoing to improve the uplink performance in what is called the CELL_FACH state. At the radio resource control (RRC) level, two basic operation modes of a mobile radio terminal, sometimes called a user equipment (UE), are idle mode and connected mode as shown in FIG. 1. In idle mode after the UE is powered on, the UE selects a mobile network to contact. It then looks for a suitable cell of the chosen network, chooses a cell to provide available services, and tunes to that cell's control channel, i.e., the UE camps on that cell. At that point, the idle UE can receive system information and cell broadcast messages. The UE stays in idle mode unit it transmits a request to establish an RRC connection. In idle mode, the UE is identified by non-access stratum identities like an International Mobile Subscriber Identifier (IMSI), a Temporary Mobile Subscriber Identifier (TMSI), and a Packet-TMSI (P-TMSI). The radio access network has no information of it own about the individual idle mode UEs and can only address all UEs in a cell.

The connected mode is divided into service states, which define what kind of physical radio channels a UE is using. FIG. 1 also shows the main RRC service states in the connected mode and the transitions between states and between modes. In the CELL_FACH state, no dedicated physical channel is allocated to the UE, but the random access and forward access common channels (RACH and FACH respectively) are used instead. The UE is known on cell level (i.e., it has a cell id), has a protocol layer 2 connection (including media access control (MAC) and radio link control (RLC) protocol layers), but does not have dedicated physical (PHY) layer 1 radio resources. Instead, common physical layer radio resources are shared between mobile terminals in the CELL_FACH state for transmitting both signaling messages and small amounts of user plane data to UE's in the CELL_FACH state.

An uplink improvement planned for future cellular radio systems is activation in the CELL_FACH state of an uplink enhanced-dedicated channel (E-DCH) physical channel established with HSUPA. The E-DCH is normally used as a dedicated physical layer channel in CELL_DCH state (shown in FIG. 1) with one separate E-DCH resource allocated per UE. This can be performed by using a pool of E-DCH resources that can be temporarily assigned to a UE in the CELL_FACH state. Such a pool of E-DCH resources is termed "common E-DCH resources." The E-DCH resources may be managed by a Radio Network Controller (RNC) in 3G UMTS type systems, but the pool of common E-DCH resources may be managed by the radio base station, sometimes referred to as a NodeB, to speed up the allocation of radio resources by not having to involve an RNC or other management node in the allocation procedure.

Figure 2:
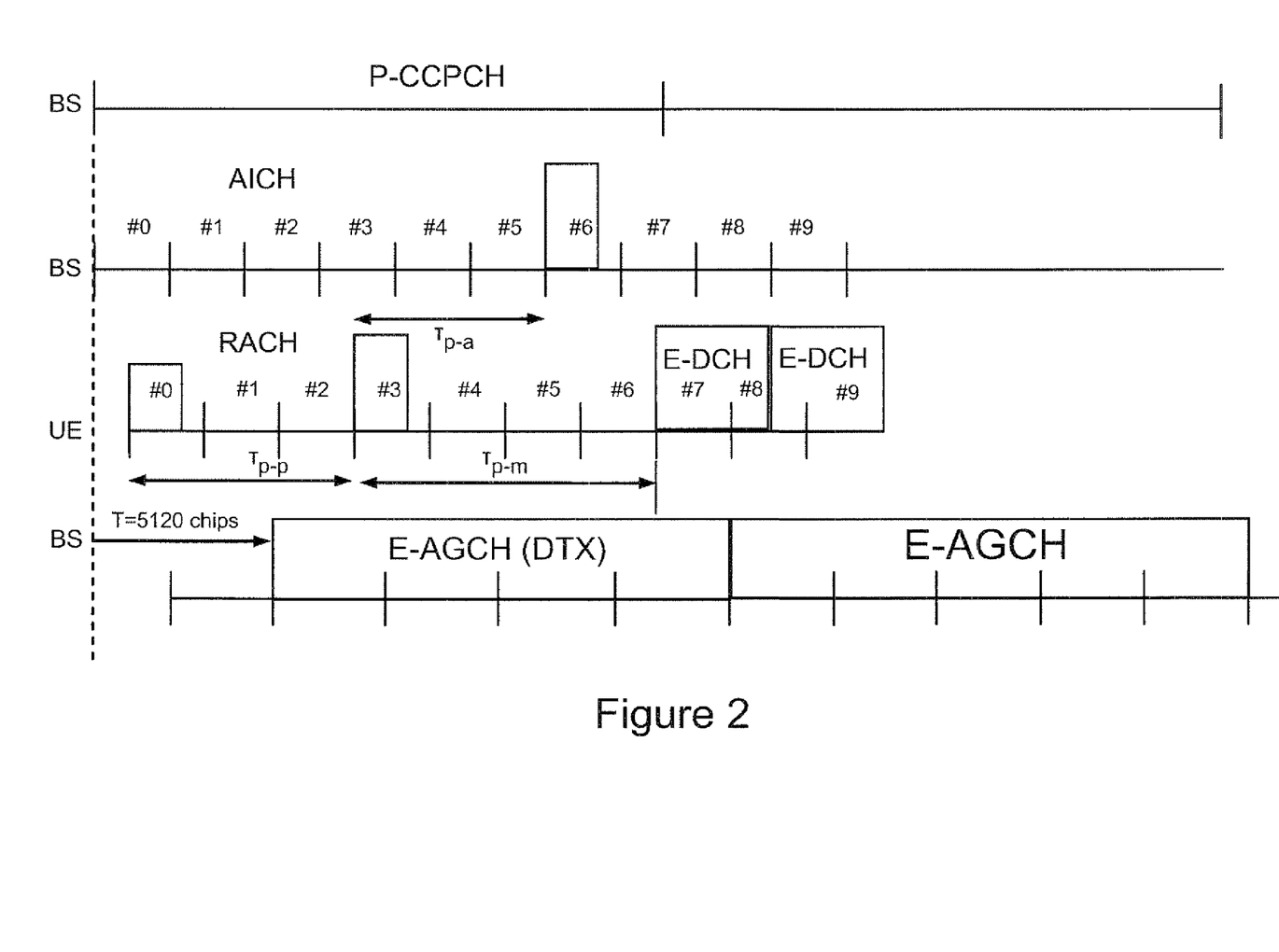
FIG. 2 is a non-limiting example signaling diagram showing signaling relating to common E-DCH resource allocation and configuration.

Consider the example situation with reference to FIG. 2 that illustrates one way common E-DCH resources may be acquired in 3GPP release 8. The base station transmits over a primary-common control physical channel (P-CCPCH) to provide downlink frame and acquisition indicator channel (AICH) timing information for UEs in the cell. The AICH is used by the base station to indicate reception of the RACH signature sequence or preamble over the random access channel (RACH) from a mobile terminal in the CELL_FACH state. The AICH echoes back an identical signature sequence or preamble as received on the RACH. In FIG. 2, the UE in the CELL_FACH state needs a common E-DCH resource to communicate with the radio access network and sends a RACH request with a RACH preamble in time slot #0 at an initial low amplitude level. The base station does not receive that first RACH request indicated by the fact that there is no echoing AICH transmission. The UE sends a second preamble on the RACH after Tp-p in time slot #3 at a higher amplitude because UEs often use a power ramping procedure on initial requests on the RACH. The base station receives and acknowledges the second preamble in time slot #6 on the AICH. In the AICH acknowledgement, the base station echoes back the same second RACH preamble and also informs the UE which common E-DCH resource it has assigned to the UE.

A common E-DCH resource is defined in the non-limiting example of Release 8 by: an uplink (UL) scrambling code, a Fractional—Dedicated Physical Channel (F-DPCH) code and timing offset, E-DCH Absolute Grant Channel (E-AGCH)/E-DCH Relative Grant Channel (E-RGCH)/E-DCH HARQ Acknowledgement Indicator Channel (E-HICH) codes and signatures, and High Speed Dedicated Physical Control Channel (HS-DPCCH) parameters such as power offsets and Channel Quality Indicator (CQI). The UE may transmit on the common E-DCH after receiving the AICH acknowledgement.

It is significant that at the point the base station initially assigns the common E-DCH resource and starts receiving the uplink E-DCH transmission, the base station is not aware of the identity of a UE or UEs transmitting on that common resource. As a result, two or more UEs selecting the same preamble in the same access slot will cause a collision on the common uplink E-DCH radio resource. Assume for example that UEs may chose from 16 preambles and 7 or 8 access slots from a 10 ms RACH access slot set to request access to the common E-DCH. Assume also that two UEs transmit the same preamble in the same RACH access slot, and the base station is NodeB acknowledges the preamble on the AICH. As a result, both UEs using the same acknowledged preamble start uplink transmission using the same common E-DCH radio resource resulting in collision.

This is not a problem for UEs that already have a radio resource control (RRC) connection and thus can include their Radio Network Temporary Identifier (RNTI) in the header of each medium access control (MAC) packet data unit (PDU) sent on the common E-DCH resource. As a result, the base station can read the RNTI in the PDU header and uniquely identify the UE transmitting on the common E-DCH radio resource. The base station then echoes the detected RNTI on a downlink control channel, the E-AGCH, being monitored by UEs that want to use the common E-DCH radio resource. The transmitting UEs read the RNTI, and only the UE detecting its own RNTI then continues the uplink transmission using the common E-DCH radio resource.

But this collision avoidance mechanism only works for UEs that already have an RRC connection, and thus, have an RNTI. UEs entering from idle mode do not have an RNTI yet, and thus, are unknown on the MAC level. Accordingly, idle mode UEs or UEs in some other mode without a valid RNTI need a different solution. One solution might be to include a core network identifier, e.g. the Temporary Mobile Subscriber Identity (TMSI), for such UEs in a MAC header. But that would increase protocol overhead and complexity as the protocols would then have to support both radio network and core network identifiers for contention resolution on the common E-DCH. Hence, there is a need for better management of uplink common E-DCH resources used by UEs in idle mode.

The technology in this application provides for reliable and efficient use to of a common uplink radio resource, like the common E-DCH resource, when UEs without RNTIs, e.g., idle mode UEs, are transmitting on the common uplink radio resource.

A data unit is to be transmitted from a UE to the network using a common uplink radio resource accessible to multiple UEs. The UE determines and adds error detection bits for the data unit to generate a new data unit. The new data unit is divided into segments at a lower protocol layer with a header corresponding to that lower protocol layer being added to each segment. The segments are transmitted using the common uplink radio resource. The added error detection bits are used in the network to determine the correctness of the information in a data unit assembled using segments received on the common uplink radio resource.

In a preferred but non-limiting example embodiment, the error detection bits are cyclic redundancy code (CRC) bits and the determining of the error detection bits includes calculating a CRC for the higher protocol layer data unit. The added CRC bits may be used in the network to determine whether the segments received using the common uplink radio resource are from the same UE or from different UEs. The common uplink radio resource is a common enhanced dedicated channel (E-DCH) resource, and the UE lacks an RNTI, e.g., the UE is in an idle mode. The higher protocol layer data unit is a media access control (MAC)-c protocol data unit (PDU), and each segment corresponds to a MAC-is PDU. The CRC bits are attached to the MAC-c PDU before the segmenting. Various attachment embodiments, such as appending the CRC bits to the beginning or the end of the MAC-c PDU, are possible as well as others.

Other non-limiting example embodiments are possible. For example, the data unit to be segmented may be a protocol layer 3 Non Access Stratum (NAS) message or a Radio Resource Control (RRC) message rather than a protocol layer 2 MAC message.

In the network, a node receives segments from one UE, or in the case of collision potentially several UEs, transmitted on the common uplink radio resource and assembles them into an assembled data unit. The node uses the error detection bits appended to the assembled data unit to determine if all of the segments are from the same UE.

In the preferred but non-limiting example embodiment, each segment corresponds to a MAC-is PDU, and the network node assembles MAC-c PDU from the segments after removing the MAC-is header from each segment. The node calculates a CRC for an assembled MAC-c PDU and compares the calculated CRC with the CRC included with the assembled MAC-c PDU. If the compared CRC and the included CRC do not match, then the assembled MAC-c PDU is discarded. If they do match, then the included CRC bits are removed, and the assembled MAC-c PDU is passed on to a higher protocol layer.

The network node apparatus may be implemented in a radio base station, a radio network controller, or in a core network node.

DETAILED DESCRIPTION

In the following description, for purposes of explanation and not limitation, specific details are set forth such as particular architectures, interfaces, techniques, etc. However, it will be apparent to those skilled in the art that the claimed technology may be practiced in other embodiments that depart from these specific details. That is, those skilled in the art will be able to devise various arrangements which, although not explicitly described or shown herein, embody the principles of the claimed technology and are included within its spirit and scope. In some instances, detailed descriptions of well-known devices, circuits, and methods are omitted so as not to obscure the description with unnecessary detail. All statements herein reciting principles, aspects, and embodiments, as well as specific examples thereof are intended to encompass both structural and functional equivalents thereof. Additionally, it is intended that such equivalents include both currently known equivalents as well as equivalents developed in the future, i.e., any elements developed that perform the same unction, regardless of structure.

Thus, for example, it will be appreciated by those skilled in the art that block diagrams herein represent conceptual views of illustrative circuitry embodying the principles of the technology. Similarly, it will be appreciated various processes described may be substantially represented in a computer-readable medium and can be executed by a computer or processor.

The functions of the various elements including functional blocks labeled or described as "processor" or "controller" or "computer" may be provided through the use of dedicated hardware as well as hardware capable of executing software. When provided by a processor, the functions may be provided by a single dedicated processor, by a single shared processor, or by a plurality of individual processors, some of which may be shared or distributed. Moreover, a "processor" or "controller" may include, without limitation, digital signal processor (DSP) hardware, ASIC hardware, read only memory (ROM), random access memory (RAM), and/or other storage media.

The inventor recognized that UEs that do not have a radio network temporary identifier (RNTI), such as but not limited to UEs in an idle mode, typically only use the common E-DCH radio resource to transmit initial Radio Resource Control (RRC) and possibly initial core network (CN) messages and that such transmissions typically only last for a short time, after which the common E-DCH radio resource is released. The inventor also determined that the probability of collisions between multiple UEs transmitting on the same common E-DCH radio resource should be very low, e.g., typically less than one on one thousand. As a result, the inventor concluded that contention resolution may not be necessary, at least at the physical transmission protocol layer, for UEs without an RNTI that want to transmit on the common E-DCH radio resource.

But colliding transmissions on the common E-DCH radio resource may still cause problems on higher protocol layers in the context of a UMTS system. UMTS type systems are typically divided vertically into an Access Stratum (AS) and a Non-Access Stratum (NAS) and horizontally into a Control Plane and a User Plane. See FIG. 3 which illustrates an example UMTS protocol structure. Communication protocol layers 1 and 2 are in the Access Stratum. Protocol layer 3 is divided between the Access and Non-Access strata. Although not illustrated, layer 2 may be divided into different MAC layers such as MAC-i, MAC-is, MAC-c, etc. in the control plane.

Figure 3:
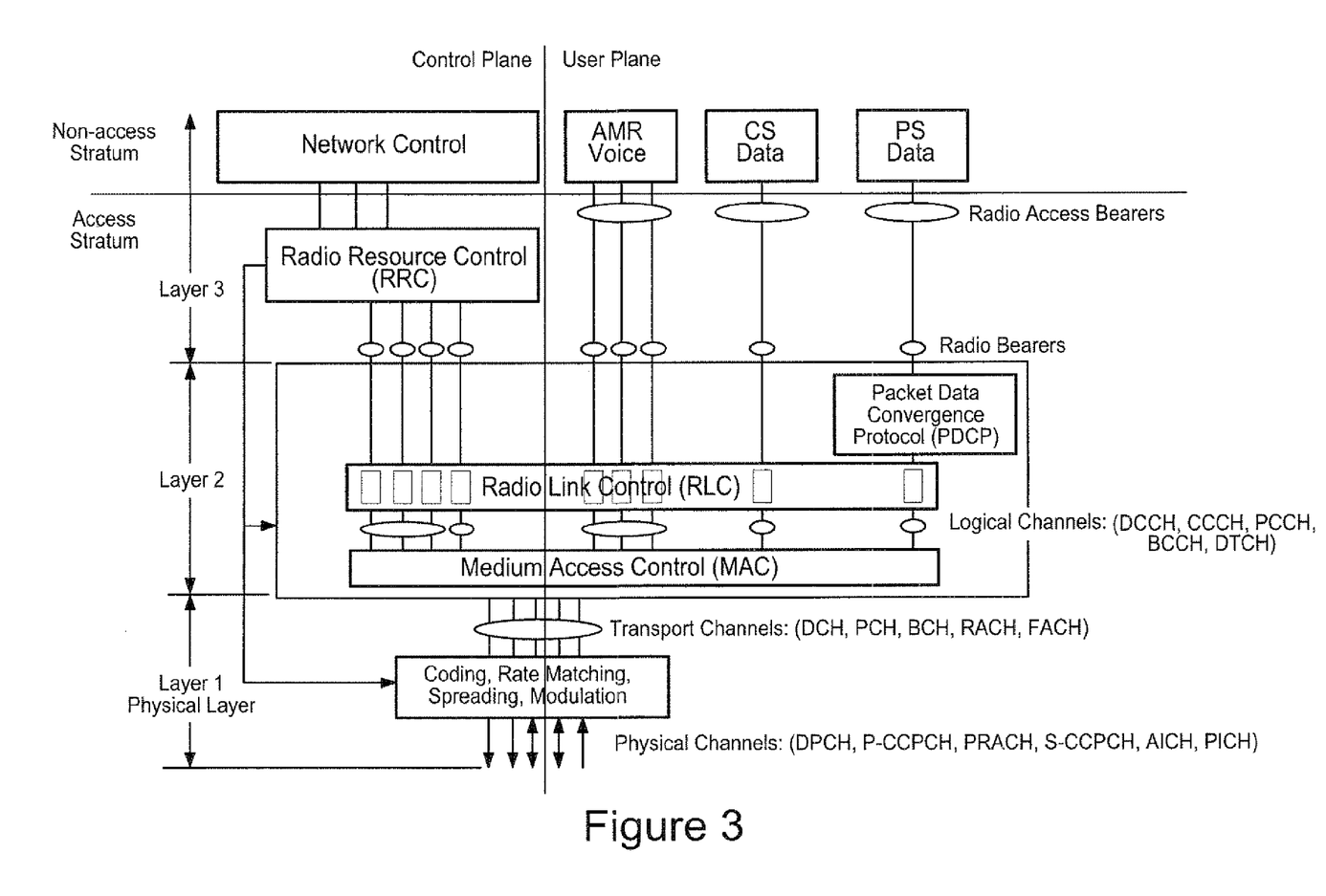
FIG. 3 illustrates an example UMTS protocol structure.

Colliding UE transmissions on the common E-DCH radio resource may cause errors in the assembly of PDUs at protocol layer 2. Indeed, there is a risk that a message assembly entity at layer 2 may assemble segments of PDUs from different UEs into one corrupt PDU, such as a MAC-c, Radio Resource Control (RRC) or Core Network (CN) PDU, that is then delivered to higher protocol layers, This will cause unexpected and undesired errors as higher layers start to process such PDUs.

Figure 4:
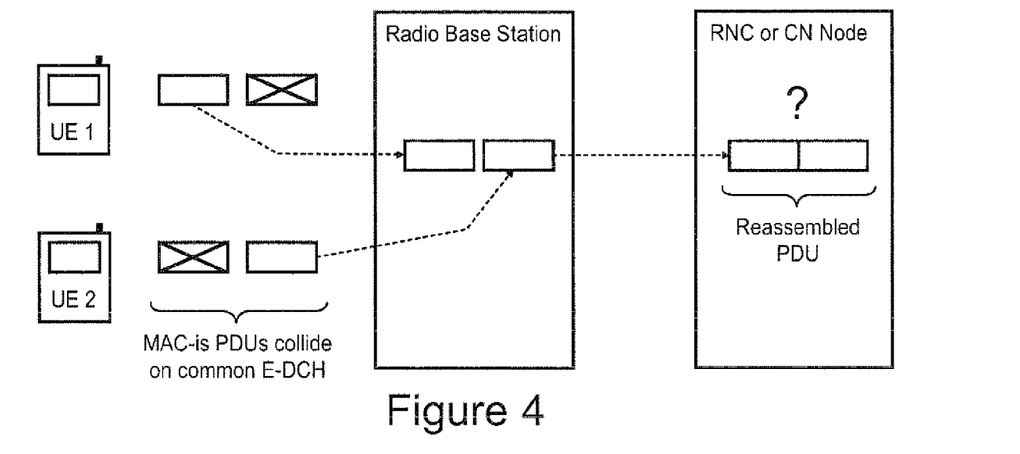
FIG. 4 is a diagram illustrating different MAC-is segments from different UEs assembled into one corrupt MAC-c PDU that is then delivered to a higher protocol layer in an RNC.

Consider the example shown in FIG. 4 which illustrates different MAC-is segments from different UEs assembled into one corrupt MAC-c PDU that is then delivered to a higher protocol layer, e.g., the RLC. One might assume that the base station or other network node responsible for decoding PDU segments (i.e., some portion of a message) received from UE1 and UE2 transmitting on the same common E-DCH resource cannot decode the uplink transmissions from either UE because they directly interfere with each other by using the same radio resource. But in fact, the base station or other network node can and often does successfully decode one of the uplink transmissions, such as the segment transmission with the stronger signal strength. Signal strength and other conditions change in radio environments rapidly, which means that in one transmission interval, the base station may decode a segment from one UE on the common E-DCH, and then in a next transmission interval, the base station may decode a segment from another UE on the common E-DCH. When those decoded PDU segments are assembled into a PDU and passed on to a higher communications protocol layer, the erroneous assumption is that the assembled data unit was sent by the same UE, which is not the case, causing confusion and errors.

To solve this problem, the UE determines error detection bits, such as cyclic redundancy code (CRC) or checksum bits, for a data unit that is to be transmitted over a common uplink radio resource that is accessible to multiple UEs, like the E-DCH. It includes those bits with the data unit thereby generating a new data unit. The UE divides the new data unit into segments at a lower protocol layer and then adds a header associated with that lower protocol layer to each segment. The segments are transmitted over the common uplink radio resource to the network. The network uses the added error detection bits to determine the correctness of the information in an assembled data unit.

Figure 5:
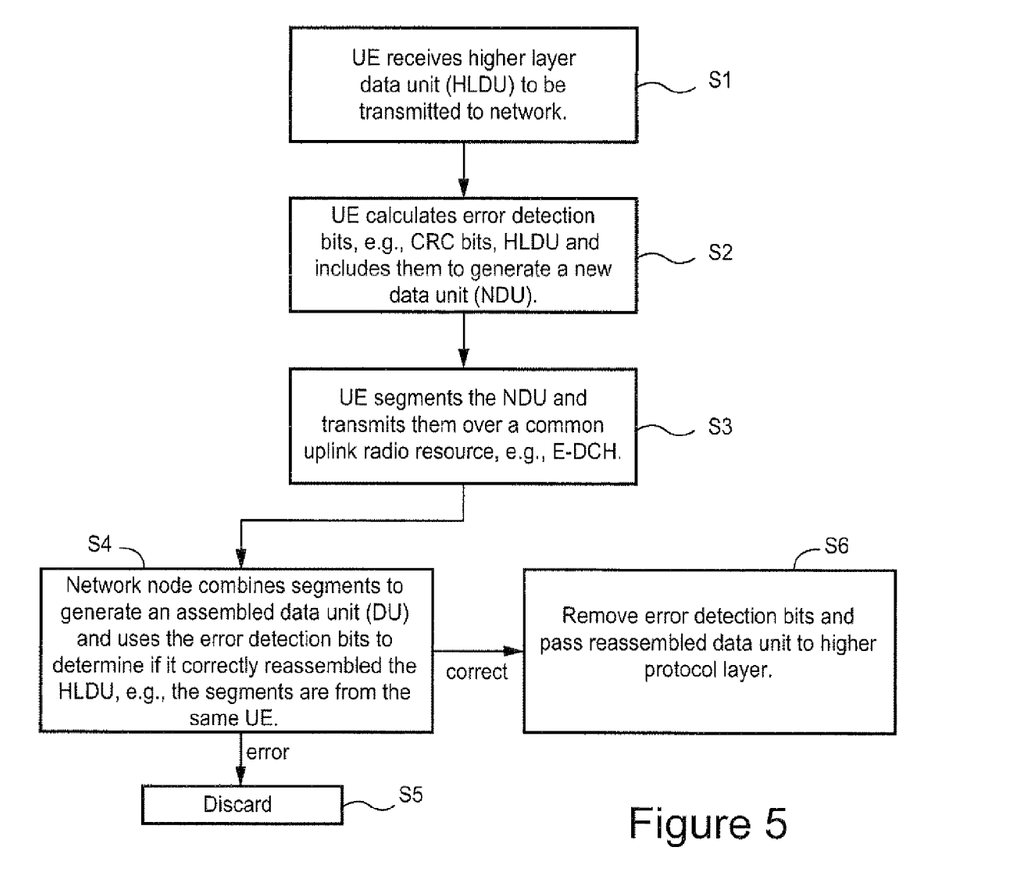
FIG. 5 is a flowchart illustrating non-limiting example steps for reliably and efficiently managing common E-DCH resources for uplink transmissions for UEs in an idle mode or lacking a RNTI.

Reference is now made to the flowchart in FIG. 5 which illustrates non-limiting example general steps for efficiently managing common E-DCH resources for uplink transmissions for UEs without an RNTI, e.g., UEs in an idle mode. Initially, a UE receives a higher layer data unit (HLDU) to be transmitted to the network (step S1). The UE calculates error detection bits, e.g., CRC checksum bits, and adds them to the HLDU to generate a new data unit (NDU) (step S2). A lower protocol layer then segments the NDU into multiple segments, attaches a lower protocol layer header to each segment, and transmits them over a common uplink radio resource, e.g., a common E-DCH (step S3). A network node receives segments on the common uplink radio resource and combines them to generate an assembled data unit. The network node uses the error detection bits to determine if it correctly reassembled the original HLDU (step S4). For example, the network node may determine whether there was an error in transmission and/or whether the segments are from the same UE. If there is an error, the reassembled HLDU is discarded (step S5). If not, the network node removes the error detection bits and passes the reassembled data unit to a higher protocol layer (step S6). The network node may be a radio base station, a radio network controller (RNC), or a core network (CN) node.

Figure 6A:
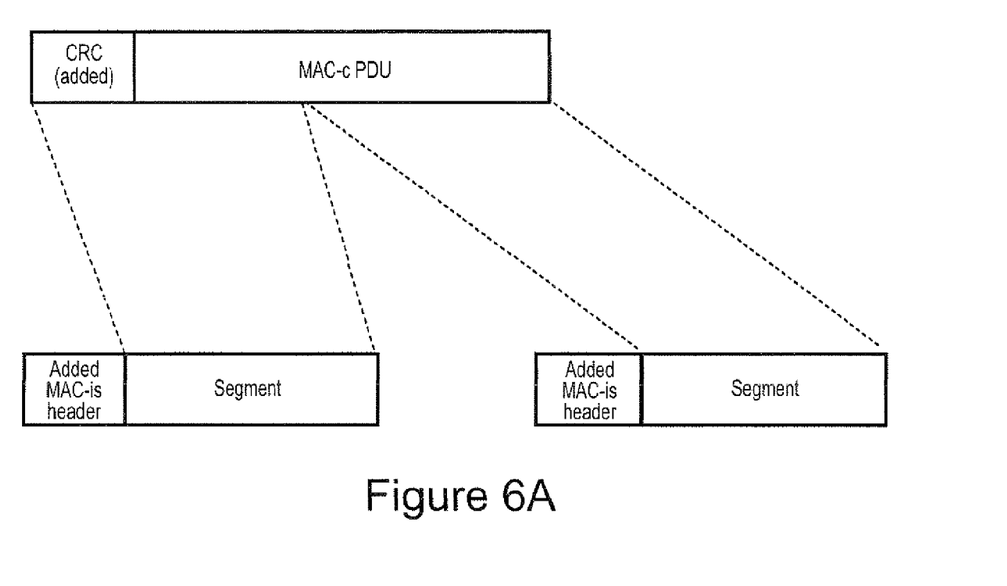
FIGS. 6A-6B are non-limiting examples of data unit and segment formats in the MAC layer.
Figure 6B:
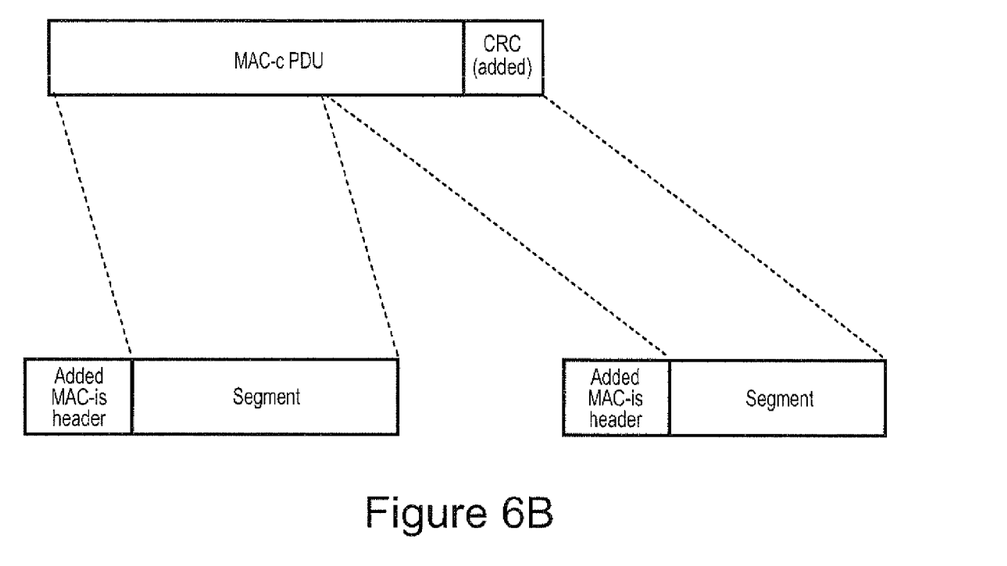

FIG. 6A shows one non-limiting example of adding CRC bits to a MAC-c PDU. A higher protocol layer in the UE provides information to be transmitted over the E-DCH channel to a MAC-c protocol layer which generates a MAC-c packet data unit (PDU). A CRC checksum is calculated based on the bits MAC-c PDU, and the resulting CRC checksum bits are appended to the beginning of the MAC-c PDU as indicated to create a new data unit. That new data unit is then divided into segments where the first segment includes the appended CRC checksum bits along with PDU payload bits. The segmentation occurs at a next lower MAC-is layer, and accordingly, a MAC-is header is added to each segment. A MAC-is header is also added to the other segment of the new data unit that includes only MAC-c PDU payload bits. Another example embodiment is shown in FIG. 6B in which the CRC checksum calculated for the MAC-c PDU is added to the end of the MAC-c PDU rather than into the beginning of the MAC-c PDU as it was in FIG. 6A. The lower MAC layer headers are then added to both segments which are then passed to the physical layer for transmission over the common E-DCH radio resource.

There are many different options for including error detection bits in a data unit or other message. Rather than adding those bits to a MAC PDU, error detection bits may be added to a Radio Resource Control (RRC) or Non Access Stratum (NAS) message. But adding error detection bits in the MAC layer has the benefit that an error in reassembly can be detected in the base station, and thus, the corrupt data unit does not need to be transmitted up to the RNC in a WCDMA type system. If MAC segmentation is not available, a CRC checksum can be added on either RLC level or RRC level. If the checksum is transmitted on the RRC level, an Integrity Protection checksum may be calculated with a default hyper frame number (HFN) and UE ID.

Figure 7:
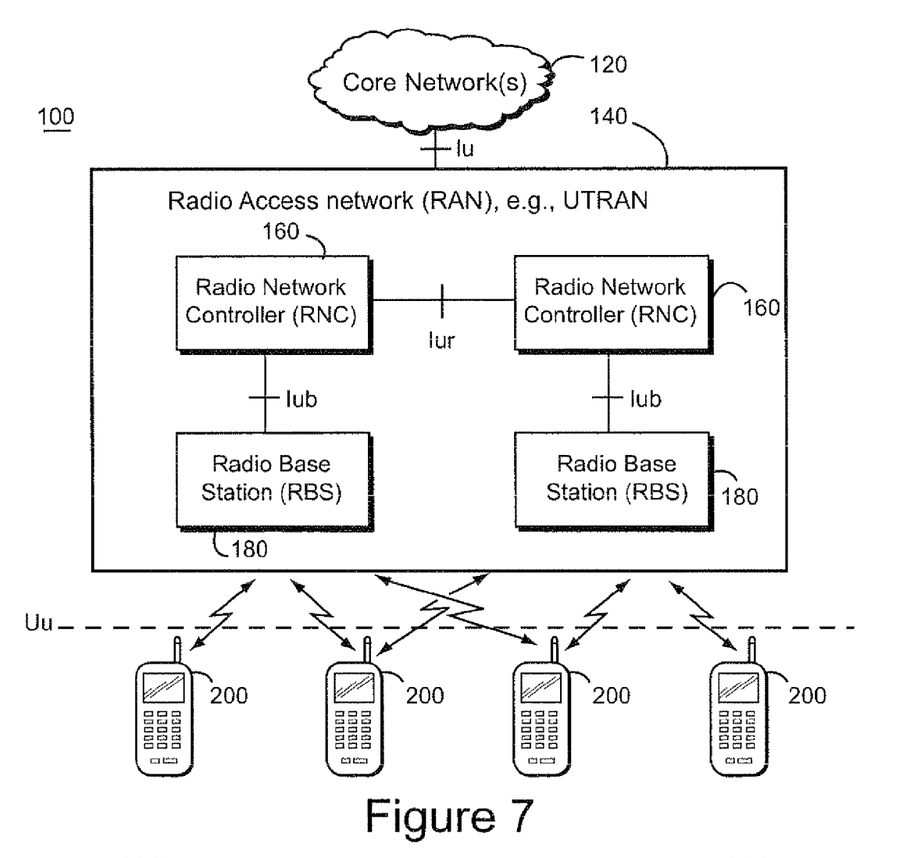
FIG. 7 is a non-limiting example function block diagram of a UMTS type radio communications system.

Referring to FIG. 7, a non-limiting ex ample system 100 that supports a common E-DCH resource is illustrated. The technology in this case may be used in such a system 100, but is not limited to use in this particular kind of system. System 100 may accommodate one or more standard architectures including a universal mobile telecommunications system (UMTS) and other systems based on code division multiple access (CDMA), GPRS/EDGE and other systems based on time division multiple access (TDMA) systems, LTE and other systems based on orthogonal frequency division multiplexing (OFDM), etc. The system 100 includes a radio access network (RAN) 140 and one or more core network(s) 120. One non-limiting example radio access network is the UMTS terrestrial access network (UTRAN) used in third generation cellular systems. Core network 140 supports circuit-based communications and packet-based communications. The RAN 140 may include (but does not require) one or more radio network controllers (RNCs) 160. The technology in this case may be applied to other RANs, such as those used in LTE and WiMax, that do not employ RNCs. Each RNC (if used) is coupled to one or more radio base stations (RBSs) 180 sometimes referred to as NodeB's. The communications interface between Node Bs and RNCs is referred to as the Iub interface, and the communications interface between RNCs is referred to as the Iur interface. Transport of information over the Iub and Iur interfaces is typically based on asynchronous transfer mode (ATM) or Internet Protocol (IP), for example. User equipment (UE) terminals 200 (also referred to as mobile terminals) communicate over an air or radio interface with the RAN 140. The radio interface is referred to as the Uu interface. The two center UEs are shown communicating with both RBSs 180.

The RAN 140 supports both high speed downlink packet access (HSDPA) and high speed uplink packet access (HSUPA), also referred to as "enhanced uplink" and as enhanced uplink dedicated channel (E-DCH). As explained above, enhanced uplink employs several uplink channels including the enhanced dedicated physical data channel (E-DPDCH) carrying enhanced uplink data (at higher bit rates) in addition to the normal dedicated physical data channels (DPDCHs) used for regular uplink data communication. The dedicated physical control channel (DPCCH) carries pilot symbols and out-of-band control signaling, and the enhanced dedicated physical control channel (E-DPCCH) carries uplink scheduling requests.

Figure 8:
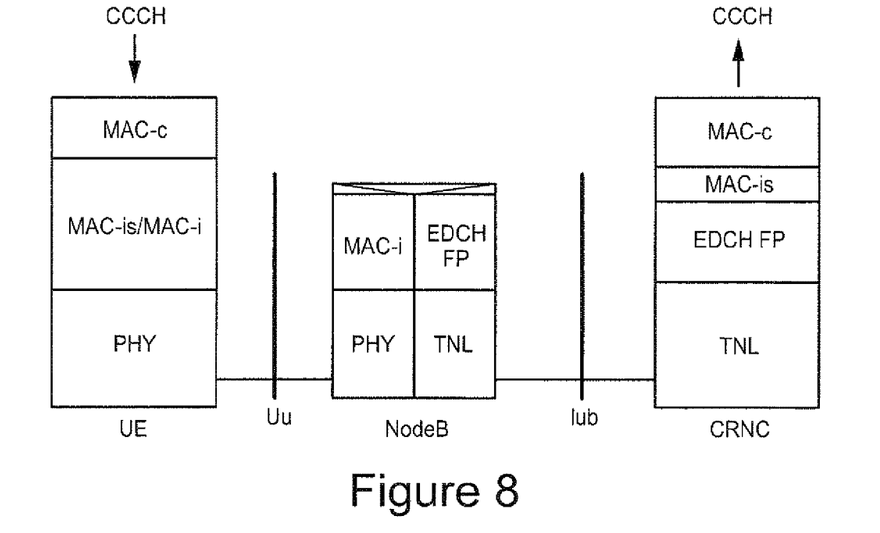
FIG. 8 is a non-limiting example communications protocol diagram that can be used in the non-limiting example shown in FIG. 7.

FIG. 8 illustrates a non-limiting example protocol architecture to illustrate one example way to provide efficient and reliable use of the common E-DCH resource by UEs without an RNTI such as UEs in an idle mode. The efficiency comes from the fact that neither contention resolution nor core network IDs are needed for communications from UEs in idle mode transmitting on the common E-DCH resource. The reliability comes from the fact that colliding transmissions can be detected in the network early in the protocol stack before erroneous or corrupted data units are passed onto higher layers.

The protocol architecture in FIG. 8 relates to the control plane and can be used with the system 100 in FIG. 7 and is applicable to the message shown in FIGS. 6A and 6B. The technology in this case may be used with other systems, other protocols, and other formats. In the UE, the MAC-c layer receives data on a logical common control channel (CCCH) to be sent over a common E-DCH radio resource. Beneath the MAC-c layer are two MAC sublayers: MAC-i and MAC-is. The segmentation and reassembly functionality is handled by the MAC-is sublayer and is terminated in a controlling RNC (C-RNC) in this non-limiting example. In other embodiments, the reassembly might occur in the base station or in a core network node. The checksum in accordance with one non-limiting embodiment may be an 8-bit Cyclic Redundancy Code (CRC) checksum calculated over the MAC SDU which corresponds to a MAC-c PDU. Of course, other size CRCs may be used.

Figure 9A:
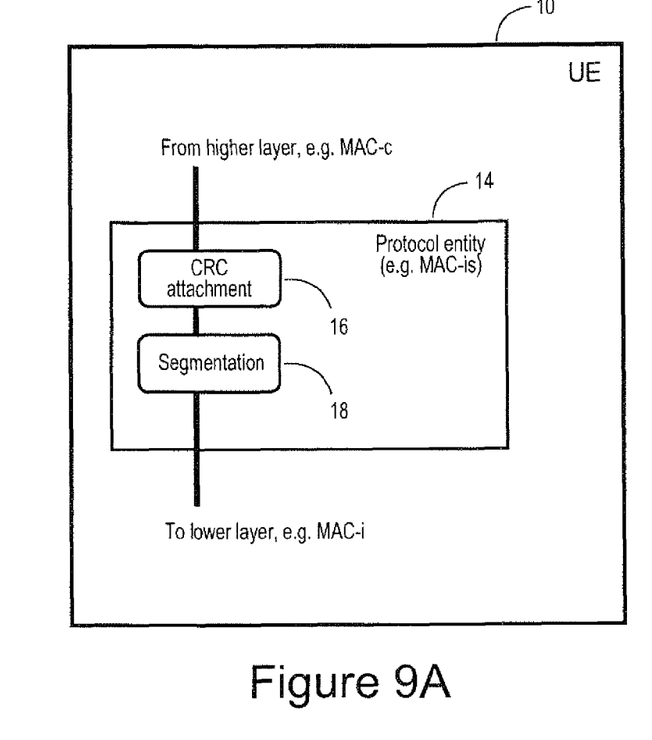
FIG. 9A is non-limiting function block diagram of UE apparatus.
Figure 9B:
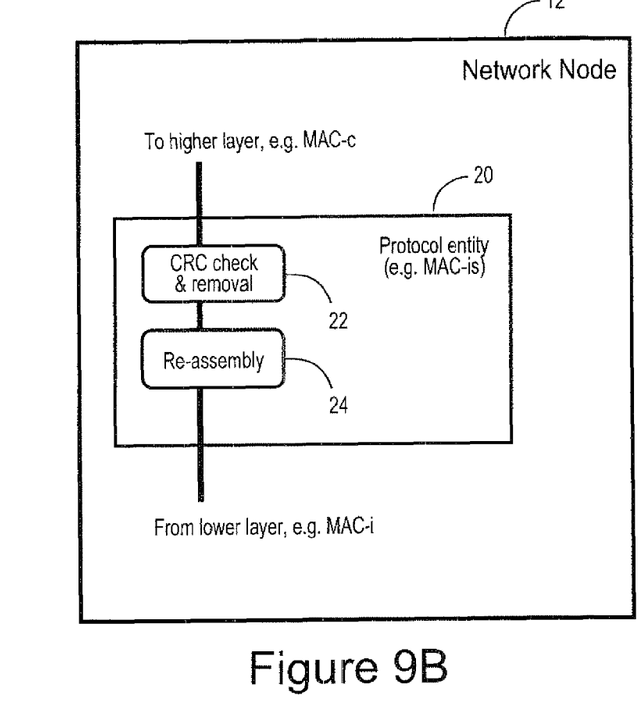
FIG. 9B is non-limiting function block diagram of network node apparatus that may be used in conjunction with the UE apparatus shown in FIG. 9A.

FIG. 9A is a non-limiting example function block diagram of a UE 10 with apparatus that may be used in conjunction with the non-limiting example function block diagram of a node being 12 shown in FIG. 9B. Features in the UE and base station which are not needed for the description relating to the technology in this case are not shown. The UE 10 includes a protocol control entity 14, which in this example, corresponds to a MAC-is protocol entity. The protocol control entity 14 provides two basic functions including a CRC checksum calculation of a received MAC-c PDU and attachment of the calculated CRC bits the MAC-c PDU. A segmentation control entity 18 receives the new PDU with the attached CRC bits and divides it into multiple segments, one of which includes the CRC bits. The segmentation control entity 18 adds a MAC-is header to each segment and then provides those segments to a next lower protocol layer, which in FIG. 8 is a MAC-i layer. Ultimately, the segments are transmitted on the common E-DCH resource of the physical layer. The network node, which is partially illustrated in FIG. 9B, includes a MAC-is protocol entity. A reassembly controller 24 receives from a base station MAC-is PDUs which are to be reassembled into a MAC-c PDU. The reassembler 24 removes the MAC-is headers from each MAC-is PDU and combines them into a reassembled data unit, i.e., a MAC-c PDU. A CRC check and removal controller 22 then calculates the CRC for the payload of reassembled PDU and compares that with the associated CRC that was included in the reassembled PDU. If the CRCs match, the CRC checksum field is removed and the MAC-c PDU is sent to a higher layer. But if the CRCs do not match, the reassembled data unit is discarded.

Figure 10:
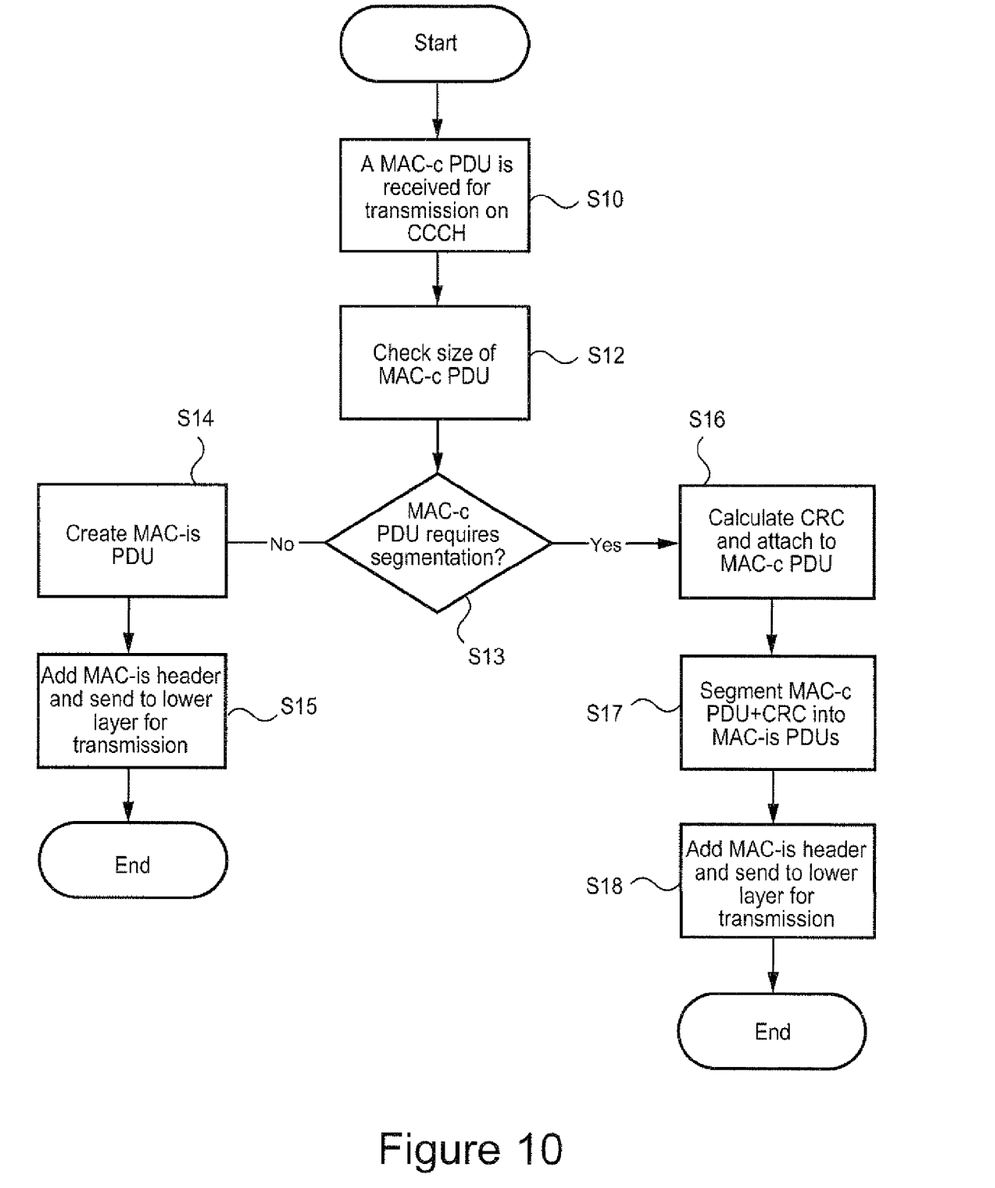
FIG. 10 is a flowchart illustrating non-limiting example steps that may be implemented in a UE using for example the UE apparatus in FIG. 9A for reliably and efficiently managing common E-DCH resources for UEs in an idle mode or lacking an RNTI.

FIG. 10 is flowchart illustrating non-limiting example steps that may be implemented in a UE using, for example by the UE apparatus shown in FIG. 9A, for reliably and efficiently managing common E-DCH resources for UEs in a idle state. Initially, a MAC-c PDU is received for transmission on a common control channel (CCCH) (step S10). The size of the MAC-c PDU is checked (step S12), and a decision is made whether the MAC-c PDU requires segmentation (step S13). If not, a MAC-is PDU is created (step S14), and a MAC-is header is added to the MAC-is PDU before it is sent to a lower protocol layer for transmission (step S15). If segmentation is required, a CRC checksum is calculated for the MAC-c PDU and attached to it (step S16). The new MAC-c PDU generated after attaching the CRC is then segmented into multiple segments corresponding to MAC-is PDUs (step S17). A MAC-is header is appended to each MAC-is PDU, which is then sent to a lower layer for transmission over the common E-DCH resource (step S18).

Figure 11:
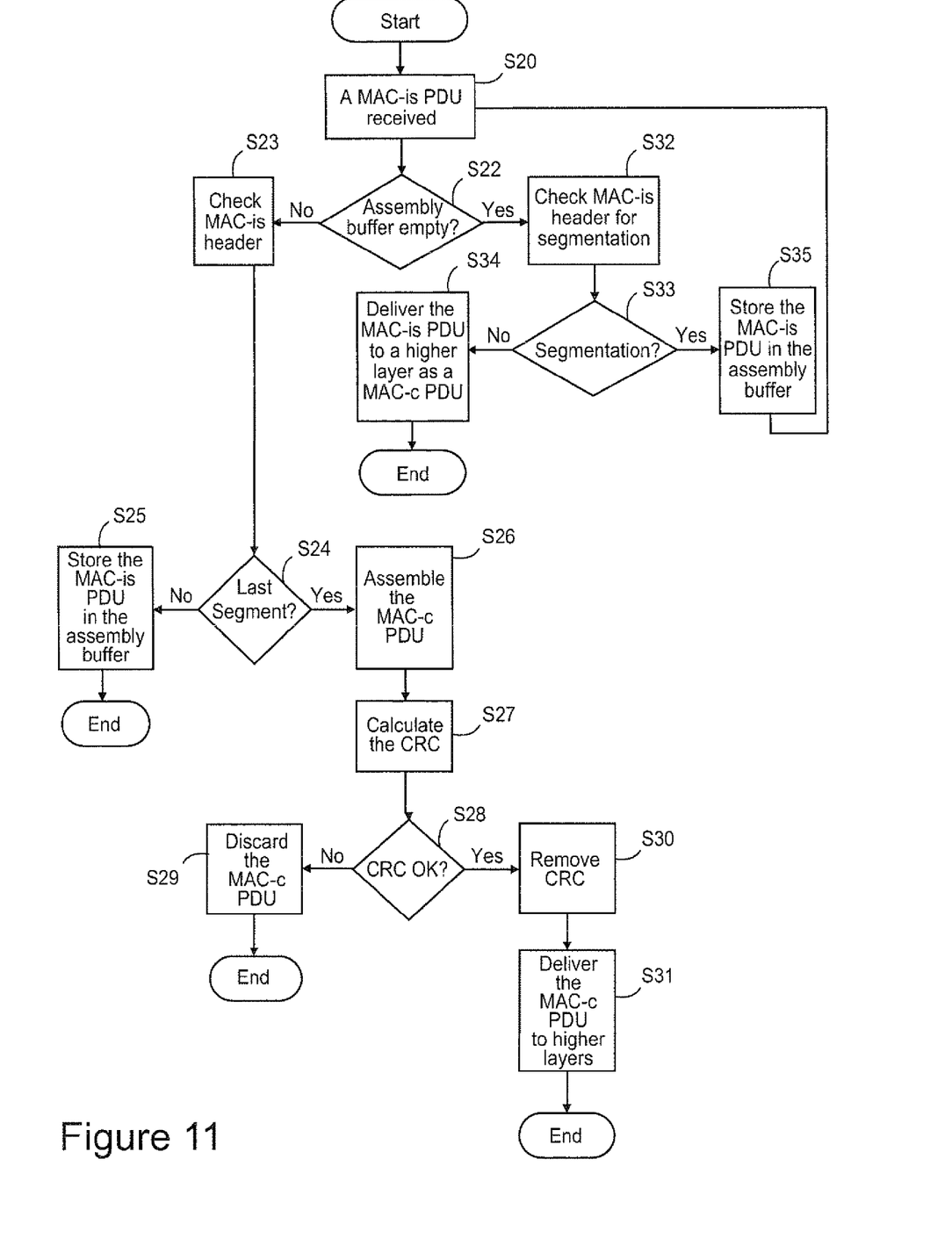
FIG. 11 is a flowchart illustrating non-limiting example steps that may be implemented in a network node using for example the network node apparatus in FIG. 9B for reliably and efficiently managing common E-DCH resources for UEs in an idle mode or lacking an RNTI.

FIG. 11 is a flowchart illustrating non-limiting example steps that may be implemented in a network node using for example the network node apparatus in FIG. 9B for reliably and efficiently managing common E-DCH resources for UEs in idle mode or without a valid RNTI. The network node receives a MAC-is PDU (step S20), and a decision is made whether an assembly buffer in a network node is empty (step S22). If the assembly buffer is empty, the MAC-is header is checked to determine whether the received MAC-is PDU is a segment or is a complete PDU in itself (step S32). Based on that header check, a segmentation decision is made in step S33. If the MAC-is PDU is no segmentation, it is delivered to a higher layer as a MAC-c PDU (step S34). If the MAC-is PDU is segmented, the MAC-is segment is stored in the assembly buffer (step S35), and control returns to step S20 (step S35).

If the assembly buffer is not empty, the header of the MAC-is PDU is checked (step S23), and a decision is made whether this MAC-is PDU corresponds to the last segment of a MAC-c PDU (step S24). If not, the MAC-is PDU is stored in the assembly buffer (step S25). If the MAC-is PDU is the last segment in a MAC-c PDU, then the MAC-c PDU is assembled using the segments stored in the assembly buffer (step S26). The CRC checksum for the assembled MAC-c PDU is calculated (step S27). A comparison is made in step S28 whether the calculated CRC corresponds to the CRC that is appended to the assembled MAC-c PDU. If the comparison fails, the MAC-c PDU is discarded (step S29). If the CRCs match, then the CRC bits associated with the MAC-c PDU are removed (step S30), and the MAC-c PDU is delivered to a higher protocol layer (step S31).

The technology in this case provides efficient and reliable use of the common E-DCH resource by UEs in an idle mode. As explained above, the efficiency comes from the fact that neither contention resolution nor core network IDs are needed for communications from UEs in idle mode transmitting on the common E-DCH resource. The reliability comes from the fact that colliding transmissions can be detected in the network early in the protocol stack before erroneous or corrupted data units are passed onto higher layers.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved, for it to be encompassed by the present claims. It is not necessary for a device or method to address each and every problem sought to be solved by the present technology, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. A method implemented in a user equipment (UE) for transmitting information over a radio interface to a network based on a communications protocol that includes multiple protocol layers, the method comprising:
   receiving a data unit to be transmitted to the network;
   determining by the UE error detection bits for the data unit;
   the UE adding the determined error detection bits for the data unit to generate a new data unit;
   the UE segmenting the new data unit into segments at a lower protocol layer; and
   the UE providing the segments for transmission to the network for reassembly into a reassembled data unit where the added error detection bits may be used to determine a transmission error in information in the reassembled data unit,
   wherein the segments are transmitted using a common uplink radio resource accessible to multiple UEs, and
   wherein the added error detection bits are useable in the network to determine whether segments received for a reassembled data unit are from a same UE or from different UEs.

2. The method according to claim 1, wherein the error detection bits are cyclic redundancy code (CRC) bits and the determining of the error detection bits includes calculating a CRC for the data unit.

3. The method according to claim 2, further comprising:
   adding a header associated with the lower protocol layer to each segment.

4. The method according to claim 3, wherein the common uplink radio resource is a common enhanced dedicated channel (E-DCH) resource, the UE does not have a valid radio network identifier, the data unit is a media access control (MAC)-c protocol data unit (PDU), each segment corresponds to a MAC-is PDU, the added header is a MAC-is header, and the CRC bits are attached to the MAC-c PDU before the segmenting.

5. The method according to claim 4, wherein the CRC bits are appended to the beginning or the end of the MAC-c PDU.

6. The method according to claim 1, wherein the data unit is part of a Non Access Stratum (NAS) message.

7. The method according to claim 1, wherein the data unit is part of a Radio Resource Control (RRC) message.

8. A method implemented in a network node included in a network that receives information from user equipments (UEs) transmitted over a common uplink radio resource based on a communications protocol that includes multiple protocol layers, the method comprising:
   detecting data unit segments at a first protocol layer received on the common uplink radio resource;

assembling the detected segments into an assembled data unit at a second higher protocol layer; and using error detection bits included with the assembled data unit to determine if all the segments in the assembled data unit are from a same UE or are from different UEs, wherein the common uplink radio resource is accessible for transmission by multiple UEs.

9. The method according to claim 8, further comprising: removing from each of the segments a header associated with the first protocol layer before assembling the segments.

10. The method according to claim 9, wherein the error detection bits are cyclic redundancy code (CRC) bits and the using of the error detection bits includes:
calculating a CRC for the assembled data unit;
comparing the calculated CRC with a CRC included with the assembled data unit;
if the calculated CRC and the included CRC do not match, then discarding the assembled data unit; and
if the calculated CRC and the included CRC match, then removing the included CRC bits and passing the assembled data unit on to a higher protocol layer.

11. The method according to claim 10, wherein the common uplink radio resource is a common enhanced dedicated channel (E-DCH) resource, UEs transmitting using the common E-DCH resource are lacking a valid radio network identifier, the assembled data unit is a media access control (MAC)-c protocol data unit (PDU), each segment corresponds to a MAC-is PDU, the segment header corresponds to a MAC-is header, and the CRC is calculated for the MAC-c PDU.

12. The method according to claim 11, wherein the CRC bits are appended to the beginning or the end of the MAC-c PDU.

13. The method according to claim 8, wherein the assembled data unit is a Non Access Stratum (NAS) message.

14. The method according to claim 8, wherein the assembled data unit is a Radio Resource Control (RRC) message.

15. The method according to claim 8, wherein the method is implemented in a radio base station, a radio network controller, or in a core network node.

16. Apparatus for use in a user equipment (UE) for transmitting information over a radio interface to a network based on a communications protocol that includes multiple protocol layers, the UE apparatus comprising:
a receiver arranged to receive a data unit to be transmitted to the network, and
electronic circuitry arranged to:
determine error detection bits for the data unit;
add the determined error detection bits for the data unit to generate a new data unit;
segment the new data unit into segments at a lower protocol layer; and
provide the segments for transmission to the network for reassembly into a reassembled data unit where the added error detection bits are useable to determine a transmission error in information in the reassembled data unit,
wherein the segments are transmitted using a common uplink radio resource accessible to multiple UEs, and
wherein the added error detection bits are useable in the network to determine whether segments received for a reassembled data unit are from a same UE or from different UEs.

17. The UE apparatus according to claim 16, wherein the error detection bits are cyclic redundancy code (CRC) bits and the electronic circuitry is further arranged to calculate a CRC for the data unit.

18. The UE apparatus according to claim 17, wherein the electronic circuitry is further arranged to add a header associated with the lower protocol layer to each segment.

19. The UE apparatus according to claim 18, wherein the common uplink radio resource is a common enhanced dedicated channel (E-DCH) resource, the UE is lacking a valid radio network identifier when the segments are provided for transmission to the network, the higher protocol layer data unit is a media access control (MAC)-c protocol data unit (PDU), each segment corresponds to a MAC-is PDU, the added header is a MAC-is header, and the electronic circuitry is arranged to append the CRC bits to the MAC-c PDU before segmenting.

20. The UE apparatus according to claim 19, wherein the electronic circuitry is arranged to append the CRC bits to the beginning or the end of the MAC-c PDU.

21. The UE apparatus according to claim 17, wherein the data unit is a Non Access Stratum (NAS) message.

22. The UE apparatus according to claim 17, wherein the data unit is a Radio Resource Control (RRC) message.

23. Apparatus for use in a network node to be included in a network that receives information from user equipments (UEs) transmitted over a common uplink radio resource based on a communications protocol that includes multiple protocol layers, the network node apparatus comprising:
means for detecting data unit segments at a first protocol layer received on the common uplink radio resource;
means for assembling the detected segments into an assembled data unit at a second higher protocol layer; and
means for using error detection bits included with the assembled data unit to determine if all the segments in the assembled data unit are from a same UE,
wherein the common uplink radio resource is accessible for transmission by multiple UEs, and
wherein the error detection bits are useable in the network to determine whether segments received for a reassembled data unit are from the same UE or from different UEs.

24. The network node apparatus according to claim 23, further comprising:
means for removing from each of the segments a header associated with the first protocol layer before assembling the segments.

25. The network node apparatus according to claim 24, wherein the error detection bits are cyclic redundancy code (CRC) bits and the means for using error detection bits includes:
means for calculating a CRC for the assembled data unit;
means for comparing the calculated CRC with a CRC included with the assembled data unit;
means for discarding the assembled data unit if the calculated CRC and the included CRC do not match; and
means for removing the included CRC bits and passing the assembled data unit on to a higher protocol layer if the calculated CRC and the included CRC match.

26. The network node apparatus according to claim 25, wherein the common uplink radio resource is a common enhanced dedicated channel (E-DCH) resource, UEs transmitting using the common E-DCH resource are lacking a valid radio network identifier, the assembled data unit is a media access control (MAC)-c protocol layer protocol data unit (PDU), each segment corresponds to a MAC-is PDU, the segment header corresponds to a MAC-is header, and the means for calculating a CRC is arranged to calculate a CRC for the MAC-c PDU.

27. The network node apparatus according to claim 26, wherein the CRC bits are appended to the beginning or the end of the MAC-c PDU.

28. The network node apparatus according to claim 23, wherein the assembled data unit is a Non Access Stratum (NAS) message.

29. The network node apparatus according to claim 23, wherein the assembled data unit is a Radio Resource Control (RRC) message.

30. The network node apparatus according to claim 23, wherein the network node is a radio base station, a radio network controller, or in a core network node.

\* \* \* \* \*

UNITED STATES PATENT AND TRADEMARK OFFICE
CERTIFICATE OF CORRECTION

| | | |
|---|---|---|
| PATENT NO. | : 8,239,743 B2 | Page 1 of 1 |
| APPLICATION NO. | : 12/340304 | |
| DATED | : August 7, 2012 | |
| INVENTOR(S) | : Wager | |

It is certified that error appears in the above-identified patent and that said Letters Patent is hereby corrected as shown below:

In Column 1, Line 57, delete "it" and insert -- its --, therefor.

In Column 3, Line 4, delete "is NodeB" and insert -- NodeB --, therefor.

In Column 3, Line 35, delete "use to of" and insert -- use of --, therefor.

In Column 4, Line 42, delete "system; and" and insert -- system; --, therefor.

In Column 5, Line 10, delete "thereof" and insert -- thereof, --, therefor.

In Column 5, Line 15, delete "unction," and insert -- function, --, therefor.

In Column 6, Line 1, delete "layers," and insert -- layers. --, therefor.

In Column 7, Line 30, delete "ex ample" and insert -- example --, therefor.

In Column 9, Line 23, delete "in idle" and insert -- in an idle --, therefor.

Signed and Sealed this
Thirteenth Day of November, 2012

David J. Kappos
*Director of the United States Patent and Trademark Office*